(12) United States Patent
DiVerde et al.

(10) Patent No.: US 6,357,698 B1
(45) Date of Patent: Mar. 19, 2002

(54) TWIN LOBE SPACECRAFT DISPENSER APPARATUS AND METHOD

(75) Inventors: Michael B. DiVerde, Rancho Santa Margarita; Kenneth Norman Telford, Huntington Beach, both of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/496,965

(22) Filed: Feb. 2, 2000

(51) Int. Cl.[7] .................................................. B64G 1/22
(52) U.S. Cl. .................................................. 244/158 R
(58) Field of Search .............................. 244/158 R, 161

(56) References Cited

U.S. PATENT DOCUMENTS

| | | |
|---|---|---|
| 2,925,965 A | 2/1960 | Pierce |
| 2,938,686 A | 5/1960 | Van Winkel et al. |
| 2,958,260 A | 11/1960 | Anderson |
| 2,976,806 A | 3/1961 | Risk et al. |
| 3,107,616 A | 10/1963 | Boaz et al. |
| 3,380,687 A | 4/1968 | Wrench et al. |
| 3,420,470 A | 1/1969 | Meyer |
| 3,461,801 A | 8/1969 | Vitale et al. |
| 3,652,042 A | 3/1972 | Weither |
| 3,712,229 A | 1/1973 | Schock |
| 3,726,223 A | 4/1973 | Moe |
| 3,907,225 A | 9/1975 | Weither |
| 3,948,175 A | 4/1976 | Bucklisch |
| 4,044,974 A | 8/1977 | Lingley et al. |
| 4,067,308 A | 1/1978 | Andersen et al. |
| 4,106,389 A | 8/1978 | Walley |
| 4,233,882 A | 11/1980 | Eichweber |
| 4,298,178 A | 11/1981 | Hujsak |
| 4,372,216 A | 2/1983 | Pinson et al. |
| 4,444,117 A | 4/1984 | Mitchell, Jr. |
| 4,506,852 A | 3/1985 | Adams et al. |
| 4,558,645 A | 12/1985 | Boeder et al. |
| 4,625,646 A | 12/1986 | Pinson |
| 4,679,752 A | 7/1987 | Wittmann et al. |
| 4,957,046 A | 9/1990 | Puttock |
| 5,040,748 A | 8/1991 | Torre et al. |
| 5,052,640 A | 10/1991 | Chang |
| 5,107,767 A | 4/1992 | Schneider et al. |

(List continued on next page.)

OTHER PUBLICATIONS

Photograph of "Dispenser System developed for Starsem's Globalstar mission carries four satellites" date unknown.
Photograph of "Satellite dispenser system for Starsem is produced from aluminum and weighs 390 kg.", date unknown.

*Primary Examiner*—Peter M. Poon
*Assistant Examiner*—Kevin Jakel
(74) *Attorney, Agent, or Firm*—Harness Dickey & Pierce P.L.C.

(57) ABSTRACT

A dispenser apparatus and method which includes a blended dispenser shell having a lower portion and a pair of integrally formed upper support portions defining two distinct support areas on which a pair of spacecrafts can be supported in a side-by-side configuration. The upper support portions are further disposed within an envelope defined by a lower edge of the lower portion of the dispenser shell. In one alternative embodiment a pair of adapter shells are disposed on the upper support portions to enable interfacing with a standardized interface ring of each spacecraft. The embodiments of the dispenser are each formed from a graphite epoxy material by conventional construction processes and significantly reduce the overall weight of the dispenser, as compared with dispensers which support a pair of spacecrafts in a vertical configuration. The dispenser of the present invention further reduces the overall cost associated with supporting a pair of spacecrafts and reduces the amount of orbital debris which would otherwise be produced with dispensers which support a pair of spacecrafts in a vertical configuration.

17 Claims, 5 Drawing Sheets

U.S. PATENT DOCUMENTS

| | | |
|---|---|---|
| 5,125,601 A | 6/1992 | Monford, Jr. |
| 5,152,482 A | 10/1992 | Perkins et al. |
| 5,199,672 A | 4/1993 | King et al. |
| 5,393,017 A | 2/1995 | Smith et al. |
| 5,411,226 A | 5/1995 | Jones et al. |
| 5,605,308 A | 2/1997 | Quan et al. |
| 5,613,653 A | 3/1997 | Bombled et al. |
| 5,720,450 A | 2/1998 | Kanne |
| 5,779,195 A | 7/1998 | Basuthakur et al. |
| 5,860,624 A | 1/1999 | Obry et al. |
| 5,884,866 A | 3/1999 | Steinmeyer et al. |

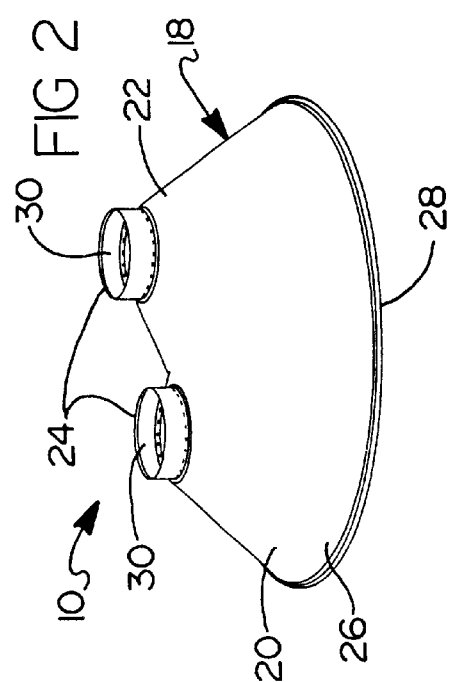
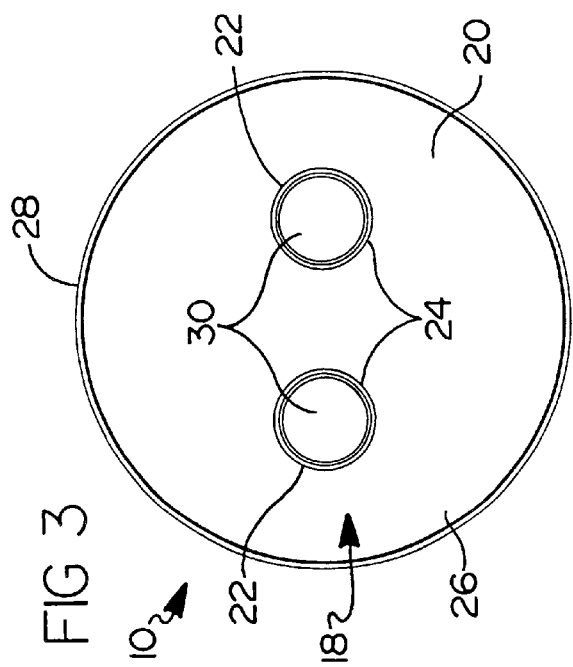
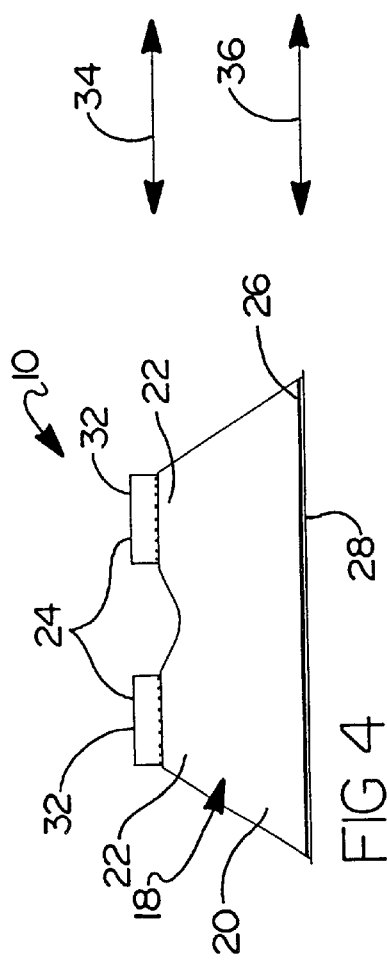

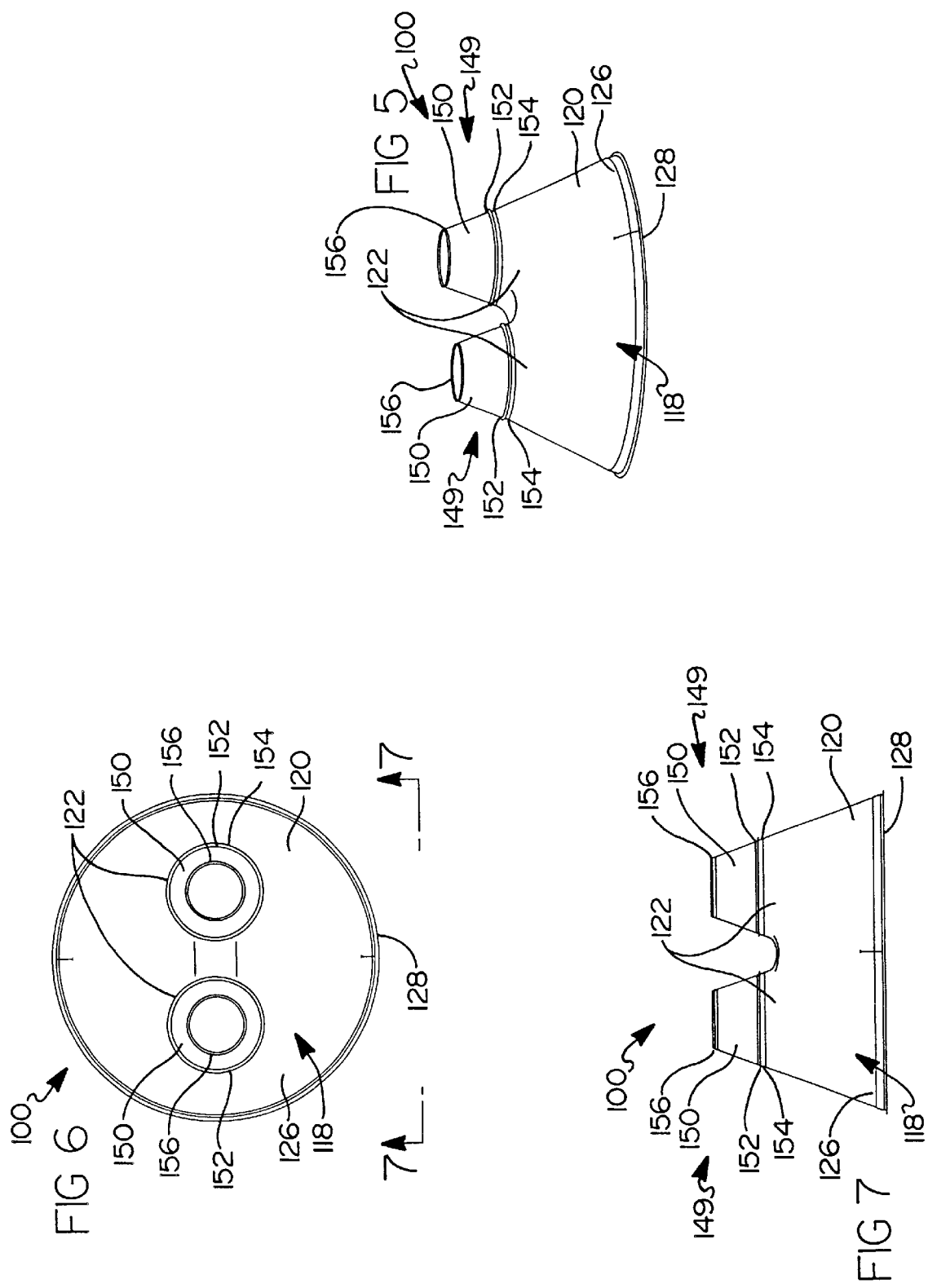

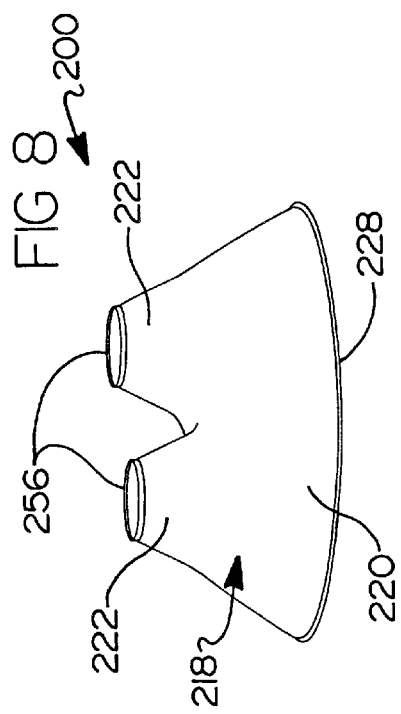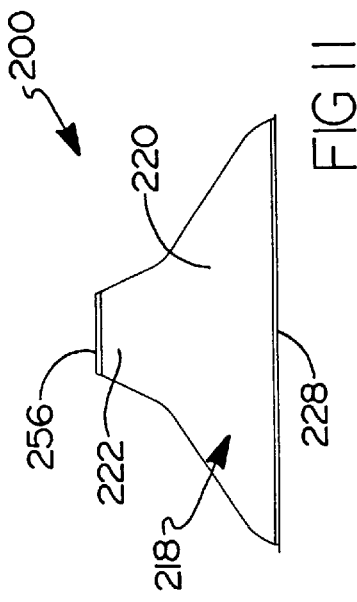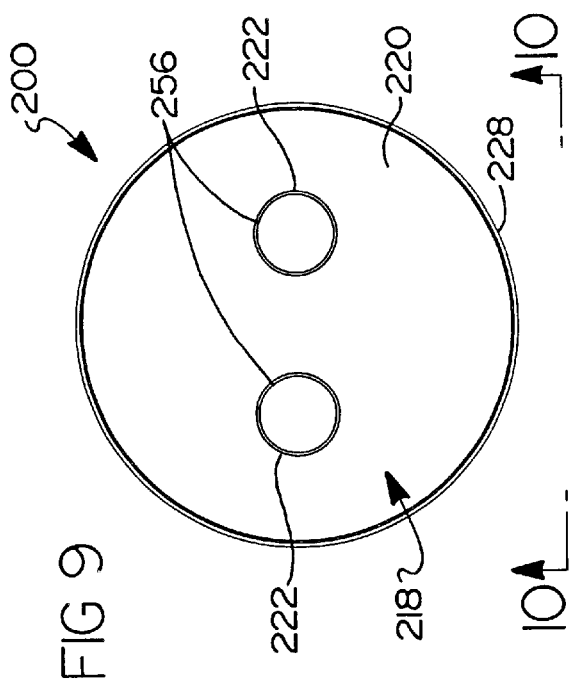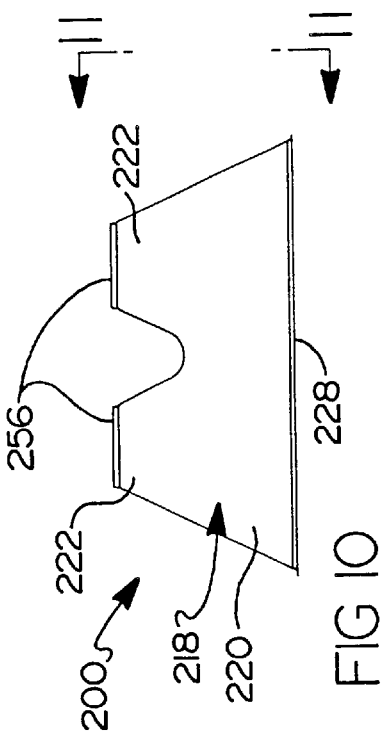

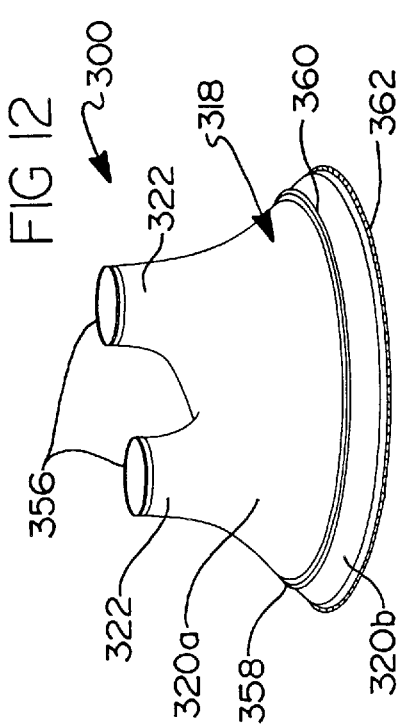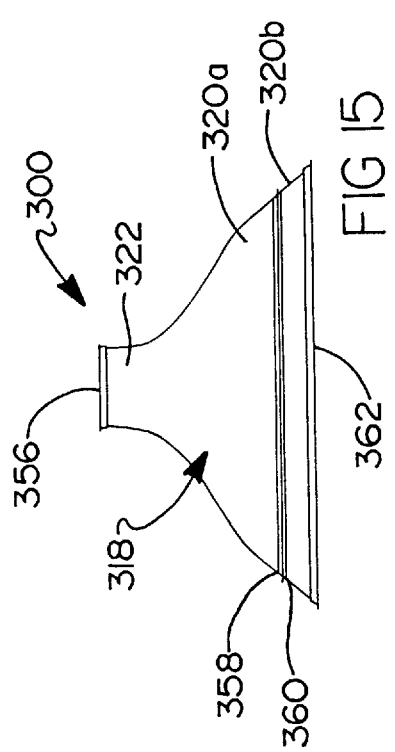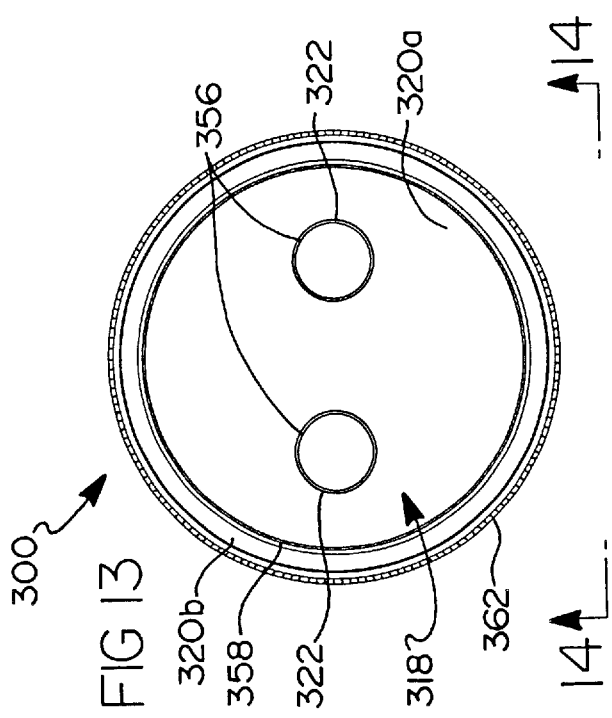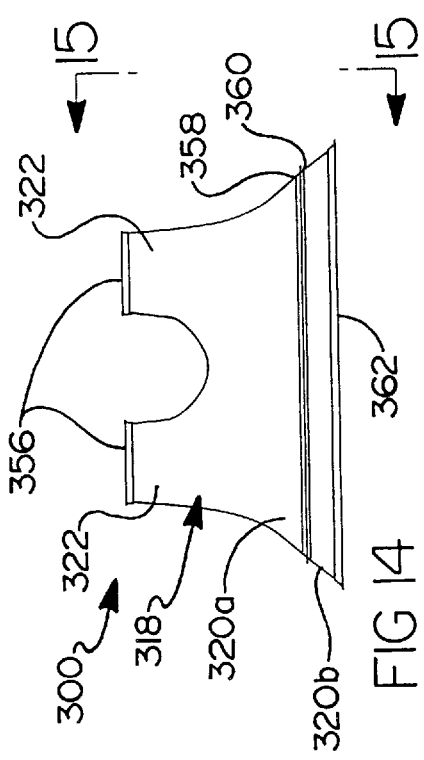

TWIN LOBE SPACECRAFT DISPENSER APPARATUS AND METHOD

STATEMENT CONCERNING GOVERNMENTALLY SPONSORED RESEARCH OR DEVELOPMENT

This invention was made under contract no. F04701-96-C-0025 awarded by the U.S. Air Force. The U.S. Government has certain rights in this invention.

TECHNICAL FIELD

This invention relates to spacecraft dispensers, and more particularly to a spacecraft dispenser for supporting a pair of spacecraft in a side-by-side configuration on a single dispenser shell.

BACKGROUND OF THE INVENTION

Spacecraft dispensers are used to support spacecraft such as satellites on a launch vehicle such as a rocket during the launch phase of a mission in which the spacecrafts are deployed into orbit about the Earth. When two spacecrafts are to be deployed from a single launch vehicle, the most common dispenser approach for supporting these spacecrafts is known in the art as the "Dual Manifest" approach. The Dual Manifest approach makes use of two separate conical payload adapters, each of which supports a single spacecraft. The adapters and their associated spacecraft are stacked vertically, and the upper adapter and spacecraft are supported by a cylindrical shell which encases the lower spacecraft. The cylindrical shell also serves to separate the lower spacecraft and its adapter from the upper spacecraft and its adapter.

The Dual Manifest approach described above has several significant drawbacks. For one, this approach is costly from a manufacturing standpoint because of the two independent adapters and two independent cylindrical support shells that are used to support each spacecraft, one above the other, on the launch vehicle. The two adapters and two support shells comprise a significant degree of weight. The upper support shell and its adapter also forms a very large piece of orbital debris when it is jettisoned prior to releasing the lower spacecraft. The added weight of the upper cylindrical support shell and adapter further serves to reduce the useable payload, thus further limiting the total weight of the two spacecrafts that can be carried by the launch vehicle.

Yet another approach to launching multiple spacecraft is the platform dispenser disclosed in U.S. Pat. No. 5,605,308, assigned to the assignee of the present application. The main drawback with this form of dispenser is the relatively high weight of the structure. This relatively high weight also limits the useable payload which can be carried into orbit by the launch vehicle.

It is therefore a principal object of the present invention to provide a dispenser structure which is capable of supporting a pair of spacecraft on a single dispenser shell to thereby provide a dispenser having a significantly reduced weight, as compared to previously designed dispensers.

It is a further object of the present invention to provide a dispenser for supporting a pair of spacecraft on a single dispenser shell in a side-by-side configuration, to thereby significantly reduce the weight associated with the dispenser.

It is yet another object of the present invention to provide a dispenser for supporting a pair of spacecraft thereon in a side-by-side configuration, wherein the dispenser includes a lower dispenser portion and a pair of upper support portions which extend from the lower portion, and which form a pair of support areas disposed within an envelope defined by an outer edge of the dispenser shell, for supporting a pair of spacecraft in a side-by-side configuration on the dispenser shell.

It is yet another object of the present invention to provide a dispenser which can be readily adapted to meet different, but standardized, spacecraft and launch vehicle mounting requirements.

SUMMARY OF THE INVENTION

The above and other objects are met by a twin lobe spacecraft dispenser apparatus and method in accordance with preferred embodiments of the present invention. The dispenser apparatus of the present invention includes a dispenser shell having a lower portion and a pair of upper support portions. In one preferred form the upper support portions are integrally formed with the lower portion and define two support areas at which a pair of spacecraft may be disposed on the single dispenser shell. In another alternative preferred embodiment a pair of cylindrical, upper dispenser rings are disposed on the upper support portions.

In various alternative preferred embodiments, the upper support portions comprise conical, integrally formed extensions of the lower portion of the dispenser shell which can support, directly thereon, a pair of spacecrafts. The two independent support portions enable a pair of spacecraft to be mounted on the dispenser shell in a side-by-side configuration, and also at a common elevation above the launch vehicle on which the dispenser shell is mounted.

In one preferred embodiment a pair of conical adapter shells are secured to the upper support portions of the dispenser shell to form extensions of the upper support portions. The conical adapter shells enable the upper support portions to interface with and support spacecraft utilizing a standard 37.0 inch (937 mm) mounting structure.

In another preferred embodiment the lower portion of the dispenser shell comprises a first portion and a second portion, with the first and second portions being secured together by an interface ring assembly. This enables the dispenser shell to be supported on launch vehicles having different diameter dispenser support surfaces.

The various preferred embodiments each include a one piece or a multi-piece dispenser shell which is adapted to support a pair of spacecraft thereon in side-by-side configuration, to thereby eliminate the need for the additional support structure that would otherwise be required when supporting a pair of spacecraft one on top of the other on a launch vehicle. This significantly reduces the weight of the dispenser apparatus and thus increases the useable payload capability of the dispenser, in addition to reducing the orbital debris created when the spacecrafts are deployed.

BRIEF DESCRIPTION OF THE DRAWINGS

The various advantages of the present invention will become apparent to one skilled in the art by reading the following specification and subjoined claims and by referencing the following drawings in which:

FIG. 2 is a perspective view of the dispenser shown in FIG. 1;

FIG. 3 is a plan view of the dispenser of FIG. 2;

FIG. 4 is a side elevational view of the dispenser of FIG. 3 in accordance with direction line 4—4 in FIG. 3;

FIG. 5 is a perspective view of an alternative preferred embodiment of the present invention specifically adapted for use with a 62.0 inch (157.48 cm) standard interface;

FIG. 6 is a plan view of the dispenser of FIG. 5;

FIG. 7 is a side elevational view of the dispenser of FIG. 5 in accordance with directional line 7—7 in FIG. 6;

FIG. 8 is a perspective view of an alternative preferred embodiment of the present invention incorporating a single piece dispenser shell structure;

FIG. 9 is a plan view of the dispenser of FIG. 8;

FIG. 10 is a side elevational view of the dispenser of FIG. 9 in accordance with directional line 10—10 in FIG. 9;

FIG. 11 is a side elevational view of the dispenser of FIG. 10 taken in accordance with direction line 11—11 in FIG. 10;

FIG. 12 is a perspective view of another alternative preferred embodiment of the dispenser apparatus of the present invention incorporating a dispenser shell having a two piece configuration to adapt to a 173 inch diameter standard interface;

FIG. 13 is a plan view of the dispenser of FIG. 12;

FIG. 14 is a side elevational view of the dispenser of FIG. 13 taken in accordance with direction line 14—14 in FIG. 13; and FIG. 15 is a side elevational view of the dispenser of FIG. 14 taken in accordance with direction line 15—15 in FIG. 14.

DETAILED DESCRIPTION OF THE PREFERRED EMBODIMENTS

Figure 1:
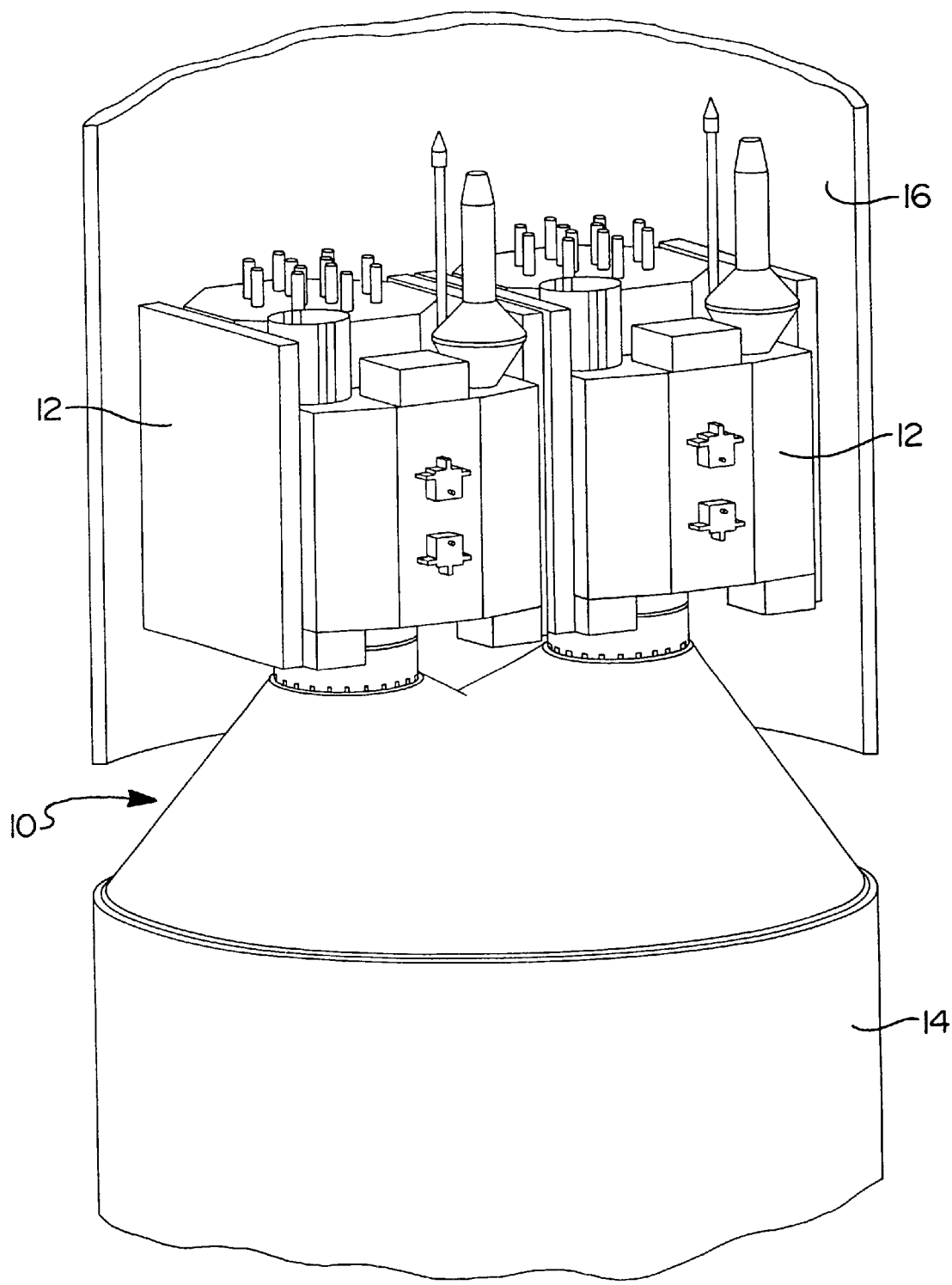
FIG. 1 is a simplified perspective view of a dispenser in accordance with a preferred embodiment of the present invention supporting a pair of spacecraft thereon in a side-by-side configuration on a portion of a launch vehicle.

Referring to FIG. 1, there is shown a dispenser 10 in accordance with a preferred embodiment of the present invention. The dispenser 10 is used to support a pair of independent spacecrafts 12 in a side-by-side configuration on a launch vehicle 14. A portion of a fairing 16 is also illustrated which is intended to enclose the dispenser 10 and the spacecrafts 12 during the launch phase of a mission in which the spacecrafts 12 are placed into the Earth's orbit.

Referring to FIGS. 2–4, the construction of dispenser 10 can be seen in greater detail. The dispenser 10 includes a blended dispenser shell 18 having a lower portion 20 and a pair of upper support portions 22. Each of the upper support portions 22 are integrally formed with the lower portion 20 so as to form a pair of extensions of the lower portion 20 on which the spacecrafts 12 can be independently supported. Each upper support portion 22 includes a cylindrical upper dispenser ring 24 secured thereto which is adapted to releasably couple to a mating dispenser ring of the spacecraft 12 to be supported thereon. The dispenser rings 24 preferably have a diameter of 37.0 inches (937 mm), which is a standard diameter which is used with many spacecraft mounting structures. A lower edge 26 of the lower portion 20 includes a lower dispenser ring 28 which is adapted to secure the entire dispenser 10 to an upper portion of the launch vehicle 14 (FIG. 1) in conventional fashion. The lower dispenser ring 28 may have a diameter of either 200.0 inches (5.06 meters) or 173 inches (4.37 meters), which are two standard diameters associated with many launch vehicles. It will be appreciated, however, that the diameter of the lower edge 26 of the dispenser shell 18 could be made to meet the specific requirement of any particular launch vehicle.

The upper support portions 22 are further formed such that each blends smoothly with the lower portion 20 of the dispenser shell 18. The two upper support portions 22 thus form "twin lobes" for forming independent support areas 30, but which are still both integrally formed with the dispenser shell 18. The shape of the dispenser shell 18 is very efficient, resulting in a high specific strength and a high specific stiffness. The shape of the dispenser shell 18 allows the loads of the two spacecraft 12 to flow smoothly downwards through the dispenser shell 18 to the launch vehicle structure on which the dispenser 10 and spacecrafts 12 are mounted. The dispenser shell 18 may be made from a variety of materials, but in one preferred form is comprised of a composite material of graphite epoxy. For maximum structural strength a sandwich construction could be employed. The dispenser shell 18 is manufactured as a single piece component by conventional manufacturing processes.

It will be appreciated immediately that the ability to support a pair of spacecraft 12 on the dispenser 10 of the present invention in a side-by-side fashion, from a single, conically shaped dispenser shell 18, completely eliminates the need for significant additional support structure normally required by dispenser arrangements in which a pair of spacecraft are disposed vertically one on top of the other. As a result, the dispenser 10 of the present invention provides a significantly lighter structure which therefore increases the useable payload significantly. The dispenser 10 further eliminates a significant amount of orbital debris that would otherwise be created with dispenser arrangements mounting the two spacecrafts in a vertical configuration one on top of the other. Still further, the dispenser 10, as a result of its reduced number of components as compared with other forms of dispensers, can be manufactured more cost effectively than other forms of dispensers.

With brief reference to FIGS. 3 and 4, it can be seen that the upper support portions 22 enable the pair of support areas 30 to both lie within an envelope formed by the lower edge 26 of the dispenser shell 18. Furthermore, the upper support portions 22 each include upper edges 32 which allow the spacecrafts 12 to be supported within a generally common plane, represented by line 34, which extends generally parallel to a plane 36 extending through the lower edge 26 of the dispenser shell 18. It will be appreciated, however, that, if needed, one or the other of the upper support portions 22 could be formed so as to extend above the other such that the two spacecrafts 12 will still be supported in a side-by-side configuration but with one of the spacecrafts 12 being disposed slightly above the other. Such a mounting may be desirable depending upon the specific construction of the spacecrafts 12.

Referring now to FIGS. 5–7, a dispenser 100 in accordance with an alternative preferred embodiment of the present invention is illustrated. Dispenser 100 is similar to dispenser 10 in construction, and like portions or components are designated by reference numerals increased by 100 over those used in connection with the description of dispenser 10. The principal difference with dispenser 100 is the inclusion of a pair of adapter shell assemblies 149. Each adapter shell assembly 149 is comprised of a conical adapter shell 150 which is secured to a respective one of the upper support portions 122 of the dispenser shell 118 by an adapter lower ring 152 and a dispenser upper ring 154. Each of the adapter shell assemblies 149 further includes an adapter upper ring 156 which is adapted to be coupled to a standardized 37.0 inch (937 mm) diameter interface ring associated with each of the spacecrafts 12.

The adapter shells 150 include a degree of taper which generally matches the degree of taper of the dispenser shell 118 such that the shells 150 form smooth, continuous extensions of their respective support portions 122. From FIGS. 6 and 7, it will be appreciated that the dispenser 100 also supports the spacecrafts 12 in a side-by-side configuration. It will be appreciated that each of the adapter shell assemblies 149 could also be made as one-piece metallic components which each comprise the shell 150, adapter upper ring 156 and adapter lower ring 152.

The dispenser 100 also allows the supporting of spacecrafts having a different diameter interface ring, such as a standard 62 inch (157.48 cm) interface ring. To this end, the diameter of the lower adapter ring 152 is selected to be 62 inches. Thus, if the adapter shells 150 are removed, then the dispenser 100 can be used to support spacecrafts having 62 inch diameter interface rings. Accordingly, the dispenser 100 is able to support spacecrafts utilizing different standardized diameter interface rings.

Referring to FIGS. 8–11, yet another alternative preferred embodiment 200 of the dispenser apparatus of the present invention is shown. Dispenser 200 is similar to dispenser 100, and like portions or components are denoted by reference numerals increased by 200 over those used in connection with the discussion of dispenser 10.

The principal difference with dispenser 200 is its one-piece construction which includes upper support portions 222 which have upper dispenser rings 256 secured directly to the upper support portions 222 of the dispenser shell 218. The dispenser rings 256 are sized to couple with a standardized 37.0 inch (937 mm) interface ring of each of the spacecrafts 12. The integrally formed upper support portions 222 eliminate the need for the adapter shell assemblies 149 shown in FIGS. 5–7. It will be appreciated, however, that the dispenser shell 218 could just as readily be formed such that the upper support portions terminate at upper dispenser rings having a 62 inch (157.48 cm) diameter if desired.

Referring now to FIGS. 12–15, yet another alternative preferred embodiment 300 of the dispenser apparatus of the present invention is shown. The dispenser 300 is similar to the dispenser 10 of FIGS. 2–4, and like components of the dispenser 300 are denoted by reference numerals increased by 300 over those used in connection with a description of dispenser 10.

The dispenser 300 includes a dispenser shell 318 having upper support portions 322 and lower portion 320. The upper support portions 322 each have upper support rings 356 adapted to couple to a standardized diameter interface ring used with the spacecrafts 12 of FIG. 1. The principal difference with the dispenser 300 is the forming of the lower portion 320 into a first portion 320a and a separate second portion 320b. The portions 320a and 320b are secured together via an interface ring assembly comprising an upper interface ring 358 and a lower interface ring 360. The two piece lower portion 320 of the dispenser shell 318 enables the dispenser 300 to be used with launch vehicles having either a 200 inch (5.06 meter) or a 173 inch (4.37 meter) diameter support structure. If a launch vehicle has a 173 inch support structure, then the portion 320b of the dispenser shell 318 would be removed. In this regard, the diameter of the upper interface ring 358 is selected to be 173 inches. If a launch vehicle had a 200 inch diameter support structure, then the portion 320b would be incorporated. In this regard, a dispenser lower ring 362 has a diameter of 200 inches. It will also be appreciated that the dispenser lower shell portion 320b, the lower interface ring 360 and the dispenser lower ring 362 could be combined into one metallic assembly if desired.

The dispensers of each of the above-described preferred embodiments of the present invention thus enable a pair of spacecrafts to be supported in a generally side-by-side configuration, which thus eliminates the need for a significant amount of additional support structure normally required when mounting two spacecrafts in a vertical configuration. The dispensers described herein can be fabricated from widely available materials and through well known construction processes for a cost reduction of up to 50% over that of conventional dispenser assemblies which dispose a pair of satellites in a vertical configuration. The dispensers disclosed herein also provide a weight reduction of up to 30% or greater over dispensers which support a pair of spacecrafts in a vertical orientation. Each of the dispensers described herein further eliminates a significant portion of orbital debris that would otherwise be created with dispensers which support a pair of spacecrafts in a vertical configuration. The various preferred embodiments of the dispenser shell also serve to efficiently transfer the weight of the two spacecrafts supported thereon and to provide a high specific strength and a high specific stiffness.

It will also be appreciated that the various dimensions provided herein for the different standardized interfaces presently used in the industry should not be construed as limiting the scope of the invention. The various preferred embodiments can be manufactured so as to meet virtually any dimension requirements imposed by the spacecrafts being supported, or by the launch vehicle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A dispenser for supporting a pair of spacecrafts in a generally side-by-side configuration on a launch vehicle, the dispenser comprising:
   a dispenser shell having a lower portion and a pair of generally conical upper support portions, said conical upper support portions forming a pair of generally side-by-side, independent, conical supports for supporting a pair of independent spacecrafts thereon; and
   said lower portion of said dispenser shell being adapted to interface with said launch vehicle such that said dispenser shell supports said spacecrafts above said launch vehicle in a generally side-by-side configuration.

2. The dispenser of claim 1, wherein said pair of upper support portions are integrally formed with said lower portion.

3. The dispenser of claim 1, wherein said lower portion of said dispenser shell comprises a conical lower portion; and
   wherein each of said conical upper support portions comprise an integrally formed conical extension of said lower portion.

4. The dispenser of claim 3, wherein said upper support portions each have an upper edge, said upper edges being generally coplanar with one another.

5. The dispenser of claim 1, further comprising at least one conical adapter shell adapted to be secured to one of said upper support portions to form an extension to said one upper support portion, to facilitate mounting of a specific diameter interface ring thereto.

6. The dispenser of claim 1, wherein said lower portion of said dispenser shell comprises a two piece assembly.

7. The dispenser of claim 1, wherein said dispenser is formed from a shell portion having a graphite epoxy composite material, and includes machined metallic upper and lower interface rings disposed on opposite edges of said shell portion.

8. A dispenser for supporting a pair of spacecrafts in a generally side-by-side configuration on a launch vehicle, the dispenser comprising:

a conical dispenser shell having a lower portion and a pair of integrally formed, conical upper support portions, said conical upper support portions extending from said lower portion to form a pair of generally side-by-side, independent conical supports for supporting a pair of independent spacecrafts thereon; and said lower portion of said dispenser shell having a lower edge portion being adapted to be secured to a portion of said launch vehicle such that said dispenser shell supports said spacecrafts above said launch vehicle in a generally side-by-side configuration.

9. The dispenser of claim 8, wherein said upper support portions each have an upper edge, and wherein said upper edges are disposed generally within a common plane such that said spacecrafts can be supported in said side-by-side configuration.

10. The dispenser of claim 8, further comprising at least one conical adapter shell adapted to engage one of said upper support portions to provide an extension to said one of said upper support portions to accommodate mounting thereon of an interface ring having a standardized diameter.

11. The dispenser of claim 8, wherein said lower portion of said dispenser shell comprises a first portion and a second portion; and an interface ring for securing said first and second portions together.

12. The dispenser of claim 8, wherein each of said upper support portions is adapted to support a cylindrical upper dispenser ring thereon.

13. The dispenser of claim 8, wherein said dispenser shell is made from a graphite epoxy composite material; and wherein an upper interface ring is disposed on an upper edge of said dispenser shell and a lower interface ring is disposed on a lower edge of said dispenser shell.

14. A method for supporting a pair of spacecrafts on a launch vehicle, said method comprising:

providing a conical dispenser shell adapted to be secured to an upper portion of said launch vehicle; and forming a pair of independent, conical upper support portions as extensions of a lower portion of said conical dispenser shell such that said conical upper support portions are configured in a generally side-by-side fashion, wherein a pair of spacecrafts may be secured to said conical upper support portions so as to be disposed in a generally side-by-side configuration.

15. The method of claim 14, further comprising the step of disposing an upper edge of each of said upper support portions within a common plane extending generally parallel to a plane extending through said lower edge of said dispenser shell, such that both of said spacecrafts are disposed at the same elevation above said launch vehicle by said dispenser.

16. The method of claim 14, further comprising the steps of:

forming said lower portion of said dispenser shell in a first portion and a second portion; and securing said first and second portions together via an interface ring assembly.

17. The method of claim 14, further comprising the step of securing a pair of conical adapter shells to each of said upper support portions, each of said conical adapter shells having an upper edge having a first diameter, each of said conical adapter shells facilitating securing of a standardized diameter interface ring to each of said upper edges of said upper support portions.

* * * * *